United States Patent
Konolige et al.

(10) Patent No.: US 9,630,316 B2
(45) Date of Patent: Apr. 25, 2017

(54) REAL-TIME DETERMINATION OF OBJECT METRICS FOR TRAJECTORY PLANNING

(71) Applicant: X Development LLC, Mountain View, CA (US)

(72) Inventors: Kurt Konolige, Menlo Park, CA (US); Ethan Rublee, Mountain View, CA (US); Mrinal Kalakrishnan, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/006,264

(22) Filed: Jan. 26, 2016

(65) Prior Publication Data

US 2016/0136808 A1    May 19, 2016

Related U.S. Application Data

(63) Continuation of application No. 14/333,258, filed on Jul. 16, 2014, now Pat. No. 9,272,417.

(51) Int. Cl.
*B25J 19/02* (2006.01)
*B25J 9/16* (2006.01)
(Continued)

(52) U.S. Cl.
CPC ............ *B25J 9/1612* (2013.01); *B25J 5/007* (2013.01); *B25J 9/1633* (2013.01); *B25J 9/1664* (2013.01); *B25J 15/0616* (2013.01); *G05B 2219/37345* (2013.01); *G05B 2219/40006* (2013.01); *G05B 2219/40512* (2013.01); *G05B 2219/40513* (2013.01); *G05B 2219/45056* (2013.01);
(Continued)

(58) Field of Classification Search
CPC . B25J 9/1697; B25J 9/10; B25J 9/1633; B25J 19/023; Y10S 901/02; Y10S 901/03; Y10S 901/41; G05B 2219/40053; G05B 2219/39057; G05B 2219/39529; G05B 2219/39393
USPC ......... 700/245, 259, 247, 258; 901/3, 41, 47
See application file for complete search history.

(56) References Cited

U.S. PATENT DOCUMENTS

| | | | | |
|---|---|---|---|---|
| 5,215,923 A | * | 6/1993 | Kinoshita | .............. B25J 9/1612 414/783 |
| 5,325,468 A | * | 6/1994 | Terasaki | ................. B25J 9/1661 700/262 |

(Continued)

*Primary Examiner* — Danela Tran
(74) *Attorney, Agent, or Firm* — McDonnell Boehnen Hulbert & Berghoff LLP

(57) ABSTRACT

Example systems and methods may be used to determine a trajectory for moving an object using a robotic device. One example method includes determining a plurality of possible trajectories for moving an object with an end effector of a robotic manipulator based on a plurality of possible object measurements. The method may further include causing the robotic manipulator to pick up the object with the end effector. After causing the robotic manipulator to pick up the object with the end effector, the method may also include receiving sensor data from one or more sensors indicative of one or more measurements of the object. Based on the received sensor data, the method may additionally include selecting a trajectory for moving the object from the plurality of possible trajectories. The method may further include causing the robotic manipulator to move the object through the selected trajectory.

20 Claims, 13 Drawing Sheets

(51) Int. Cl.
*B25J 5/00* (2006.01)
*B25J 15/06* (2006.01)

(52) U.S. Cl.
CPC ............ *Y10S 901/09* (2013.01); *Y10S 901/27* (2013.01); *Y10S 901/30* (2013.01); *Y10S 901/46* (2013.01)

(56) References Cited

U.S. PATENT DOCUMENTS

| | | |
|---|---|---|
| 6,037,733 A | 3/2000 | Genov et al. |
| 7,558,647 B2 | 7/2009 | Okazaki |
| 8,352,074 B2 | 1/2013 | Guochunxu et al. |
| 8,682,482 B2 | 3/2014 | Kosuge et al. |
| 8,706,298 B2 | 4/2014 | Goulding |
| 8,935,004 B2 | 1/2015 | Iida |
| 2009/0306825 A1 | 12/2009 | Li et al. |
| 2011/0015649 A1 | 1/2011 | Mehran et al. |
| 2011/0153076 A1 | 6/2011 | Noro |
| 2014/0025197 A1 | 1/2014 | Mattern et al. |
| 2014/0025198 A1 | 1/2014 | Mattern et al. |
| 2014/0088746 A1* | 3/2014 | Maloney ................ B25J 9/1684 700/97 |
| 2014/0121836 A1* | 5/2014 | Ban ........................ B25J 9/0093 700/259 |

* cited by examiner

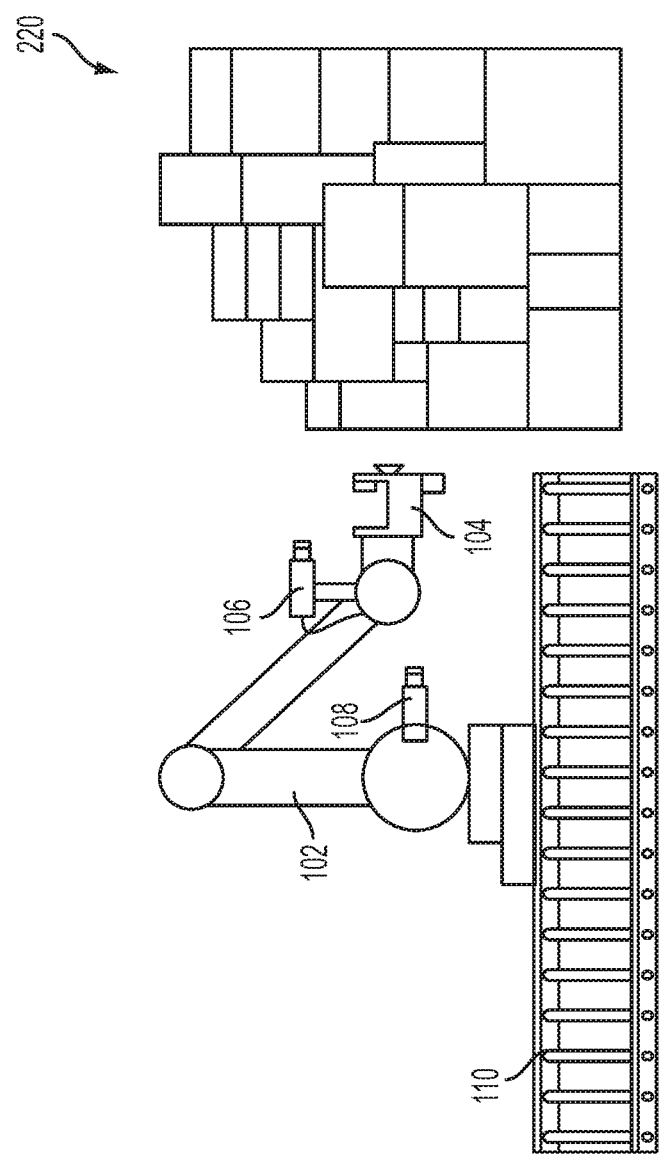

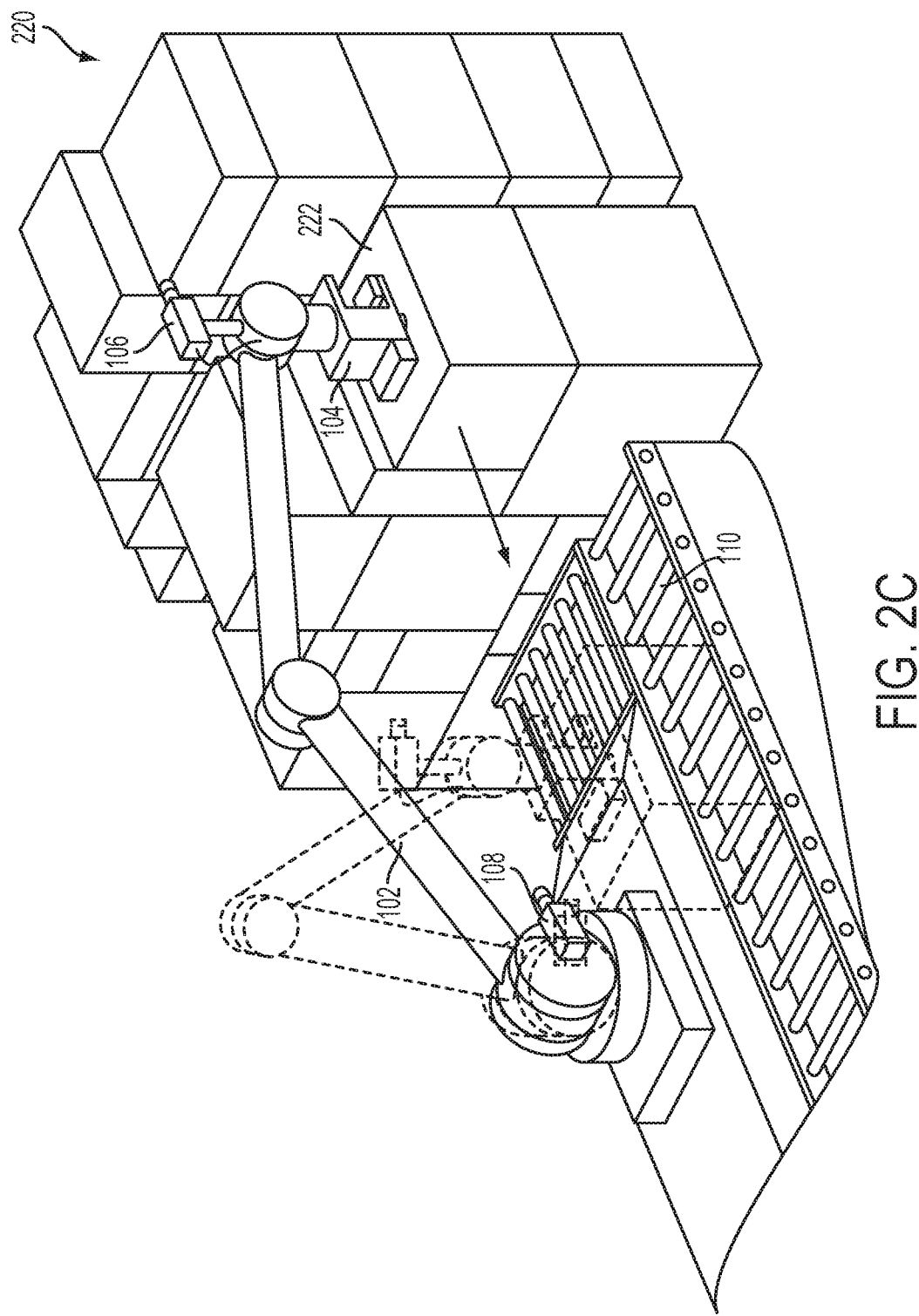

REAL-TIME DETERMINATION OF OBJECT METRICS FOR TRAJECTORY PLANNING

CROSS REFERENCE TO RELATED APPLICATION

The present application claims priority to U.S. patent application Ser. No. 14/333,258 filed on Jul. 16, 2014 and entitled "Real-Time Determination of Object Metrics for Trajectory Planning," which is herein incorporated by reference as if fully set forth in this description.

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present disclosure provides methods and apparatuses that may help to determine a trajectory for moving an object using a robotic device. A plurality of possible trajectories may be determined for moving an object with an end effector of the robotic device based on different possible object measurements. After the robotic device picks up the object, sensor data may be received from one or more sensors indicative of one or more measurements of the object. A trajectory may then be selected from the plurality of possible trajectories based on the received sensor data. The robotic device may then be controlled to move the object through the selected trajectory.

In one example, a method is provided that includes determining a plurality of possible trajectories for moving an object with an end effector of a robotic manipulator based on a plurality of possible object measurements. The method may further include causing the robotic manipulator to pick up the object with the end effector. After causing the robotic manipulator to pick up the object with the end effector, the method may also include receiving sensor data from one or more sensors indicative of one or more measurements of the object. Based on the received sensor data, the method may additionally include selecting a trajectory for moving the object from the plurality of possible trajectories. The method may further include causing the robotic manipulator to move the object through the selected trajectory.

In a further example, a system including a robotic manipulator, at least one sensor, and a control system is disclosed. The control system may be configured to determine a plurality of possible trajectories for moving an object with an end effector of the robotic manipulator based on a plurality of possible object measurements. The control system may be further configured to cause the robotic manipulator to pick up the object with the end effector. After causing the robotic manipulator to pick up the object with the end effector, the control system may also be configured to receive sensor data from the at least one sensor indicative of one or more measurements of the object. Based on the received sensor data, the control system may additionally be configured to select a trajectory for moving the object from the plurality of possible trajectories. The control system may be further configured to cause the robotic manipulator to move the object through the selected trajectory.

In another example, a non-transitory computer readable medium having stored therein instructions, that when executed by a computing system, cause the computing system to perform functions is disclosed. The functions may include determining a plurality of possible trajectories for moving an object with an end effector of a robotic manipulator based on a plurality of possible object measurements. The functions may further include causing the robotic manipulator to pick up the object with the end effector. After causing the robotic manipulator to pick up the object with the end effector, the functions may also include receiving sensor data from one or more sensors indicative of one or more measurements of the object. Based on the received sensor data, the functions may additionally include selecting a trajectory for moving the object from the plurality of possible trajectories. The functions may further include causing the robotic manipulator to move the object through the selected trajectory.

In yet another example, a system may include means for determining a plurality of possible trajectories for moving an object with an end effector of a robotic manipulator based on a plurality of possible object measurements. The system may further include means for causing the robotic manipulator to pick up the object with the end effector. After causing the robotic manipulator to pick up the object with the end effector, the system may also include means for receiving sensor data from one or more sensors indicative of one or more measurements of the object. Based on the received sensor data, the system may additionally include means for selecting a trajectory for moving the object from the plurality of possible trajectories. The system may further include means for causing the robotic manipulator to move the object through the selected trajectory.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 2A shows a robotic arm and a stack of boxes, according to an example embodiment.

FIG. 2C shows the robotic arm from FIG. 2A moving a box, according to an example embodiment.

DETAILED DESCRIPTION

Figure 1A:
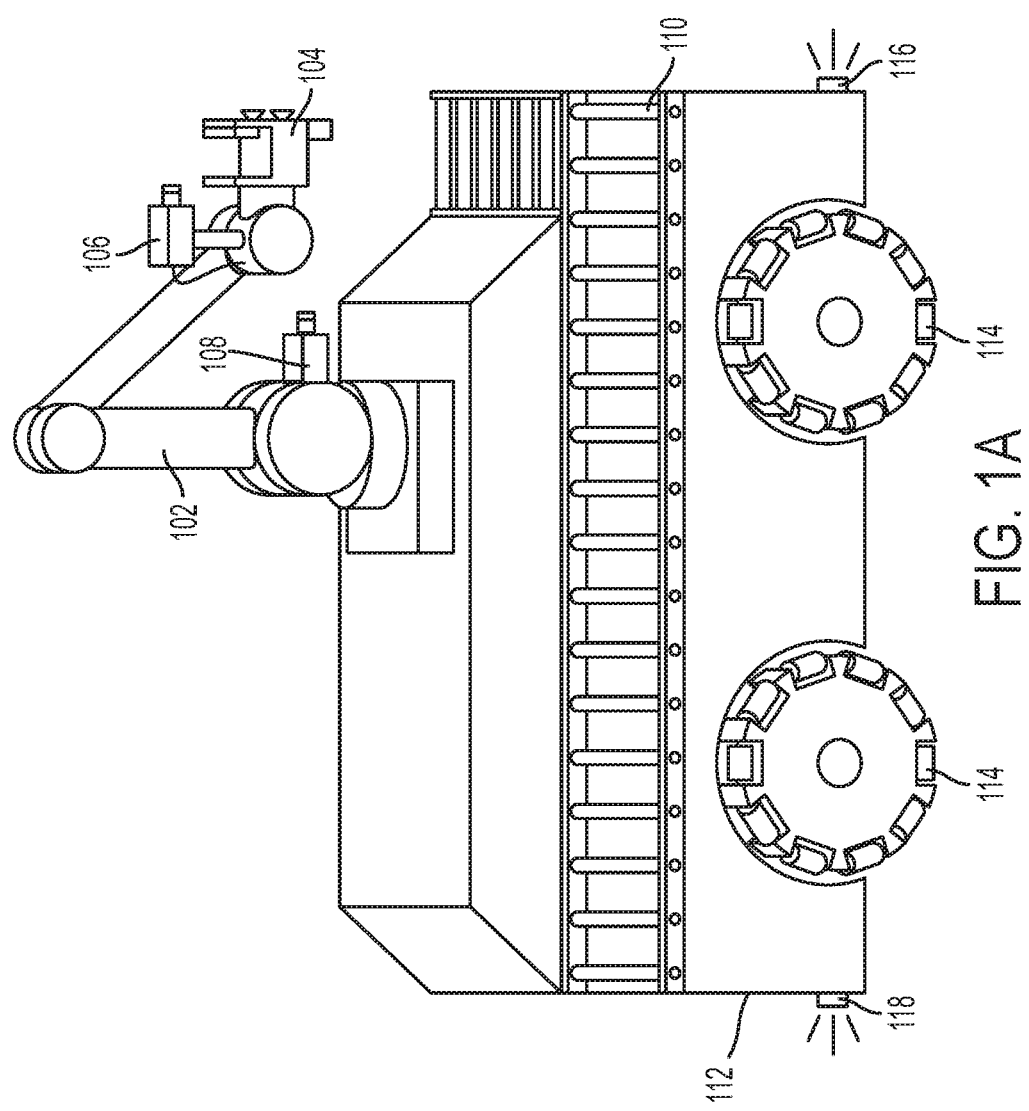
FIG. 1A shows a robotic arm mounted on a moveable cart, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Example embodiments may help to provide for determination of object metrics for trajectory planning. For instance, a robotic manipulator (e.g., a robotic arm) may be equipped with an end effector (e.g., suction gripper) to pick up and move objects such as boxes. During box picking, some information about the box being picked may be unknown until after the box has been picked up and/or moved a certain amount. For example, box weight or box depth may only be measurable by one or more sensors after the box is in the air. In some examples, these measurements may influence what trajectory should be used by the robot to transport the box. For instance, the box metrics may influence the speed at which the robot can transport the box without dropping it or whether a particular path can be used without causing a collision. Accordingly, multiple possible trajectories may be determined for different possible object measurements. After the object measurements have been determined from sensor data, a trajectory for transporting the object may be selected from the possible trajectories and used by the robot to transport the object.

A number of different types and/or combinations of sensors may be used to determine box metrology in order to determine which trajectory to use to transport the box. In some examples, a combination of sensors mounted on the robotic arm and other sensors mounted at a fixed position may be used. An object that is picked up by the robot may be occluded so that only part of the object is visible to a single camera. An example is in box-picking from a pallet or facade, where at least some of the box dimensions may be unknown and not visible to individual cameras. In such cases, data from on-arm sensors as well as off-arm sensors placed strategically within the environment can be combined and used to analyze an object's dimensions as it is being picked. In further examples, one or more unknown dimensions of an object may be moved in front of one or more of the sensors to determine or refine object measurements. Additionally, certain dimensions of the object may be uncertain with just visual data. Therefore, some or all of the sensors may be depth sensors in addition to or instead of visual cameras.

In further examples, one of the sensors may be a depth sensor with a low profile mounted on the robotic arm. In some examples, it may be difficult to place a traditional depth sensor in a reasonable configuration on the gripper to determine depth dimensions of an object, particularly when the gripper is very close to the object. Therefore, a triangulation depth sensor, including a laser beam line and offset camera, may be used. This type of sensor may have a low profile so that it can determine object depth after the gripper has made contact with an object and is therefore in close proximity to the object. In some examples, data from other types of depth sensors and/or visual sensors may be combined with data from the low profile triangulation sensor to better refine estimates of box dimension as well.

In additional examples, a force-torque sensor mounted on the robotic arm may be used to help determine box properties. The force-torque sensor may be positioned above a suction gripper in order to determine force and/or torque caused by an object held by the gripper. Based on this data, the force-torque sensor may be used to determine parameters of a picked box, such as mass, center of gravity, center of mass, how static the center of mass is, and/or inertia matrix. In additional examples, the force-torque sensor may also be used to determine one or more dimensions of an object. In particular, by pivoting an object around an edge of the object in contact with an adjacent surface using force control, the system can determine the extent of that dimension before fully picking the box.

In some examples, one or more trajectories for transporting an object may be preplanned for different possible object measurements. A planning system may require a certain amount of time to compute a trajectory given particular objects measurements. Accordingly, in some examples, it may be advantageous to select from preplanned trajectories to avoid having to make the robot wait for the planning system to determine a trajectory to use. In one example, an optimal "tree" of trajectories may be jointly planned, which have a common starting point, and fork out based on different possible measurements of one or more object properties. Then, once the measurements are obtained in flight, a path down the tree to select a particular trajectory may be chosen. For instance, a first trajectory may be planned for a light box, a second trajectory may be planned for a medium-weight box, and a third trajectory may be planned for a heavy box. In further examples, additional properties may also be considered. For example, the first trajectory planned for a light box may be further refined based on box dimensions (e.g., a. roughly square box vs. an elongated box).

In additional examples, some or all of the trajectory planning may be done on the fly (e.g., in real-time) as object measurements are determined. For instance, in one example, a conservative trajectory may be planned and used during a first period that allows for safe movement of objects at the extreme end of possible measurements (e.g., a very heavy box or a very long box). As object measurements become available, the trajectory may be modified to a more aggressive trajectory that allows for faster object transportation (e.g., of lighter or smaller boxes). In some examples, multiple levels of refinement may occur at different points in time as more precise measurements are determined. In further examples, a combination of preplanned trajectories and on-the-fly adjustments may be used. For instance, preplanned trajectories may be determined for different ranges of possible measurements e.g., for small boxes, medium-size boxes, and large boxes). One of the preplanned trajectories may be selected based on which range the object falls into, and then the trajectory may be further refined based on exact object measurements and/or based on other object properties.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Of course, examples herein may be applied toward objects other than boxes as well, and toward objects of various sizes and shapes.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable can 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

Figure 1B:
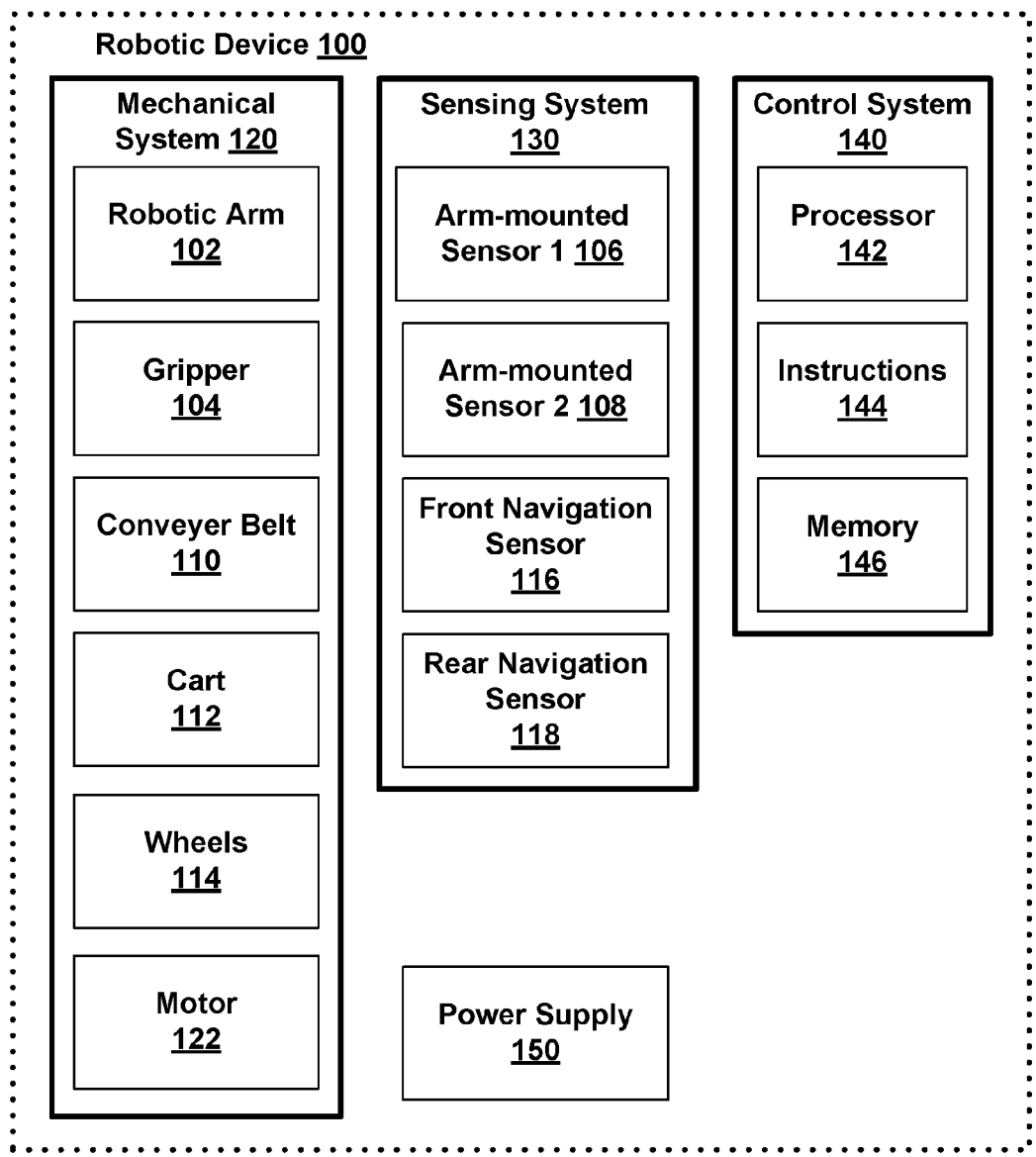
FIG. 1B is a functional block diagram illustrating a robotic device, according to an example embodiment.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIG. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D) or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2B:
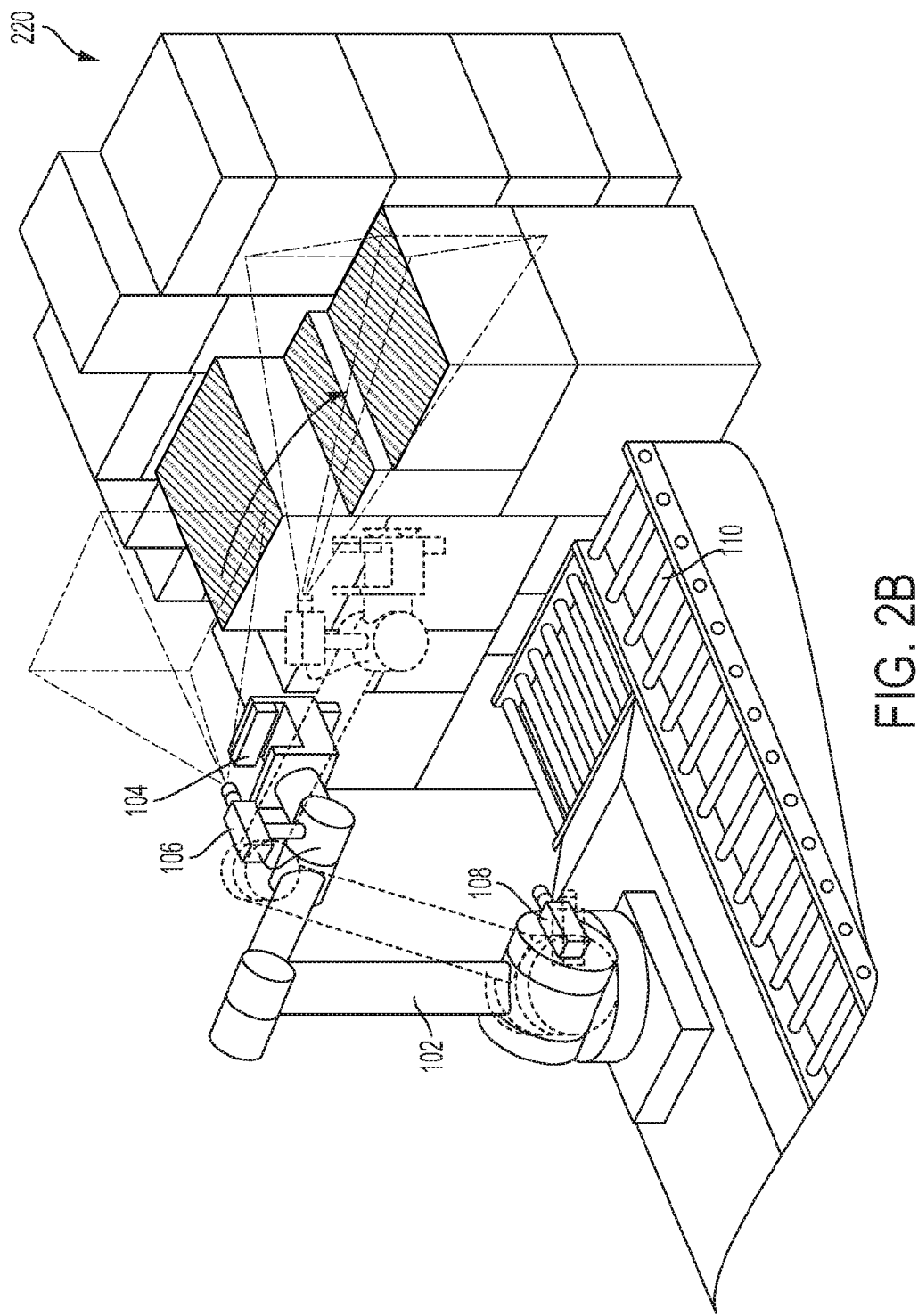
FIG. 2B shows scanning of the stack of boxes from FIG. 2A by a sensor mounted on the robotic arm, according to an example embodiment.

According to various embodiments, a perception-guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogenous mix of shapes and sizes of boxes.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 213. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with tine pose estimation, potentially giving better integration results.

In further examples, a virtual environment may be built up using a 3D volumetric or surface model to integrate information from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

in some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g. 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3:
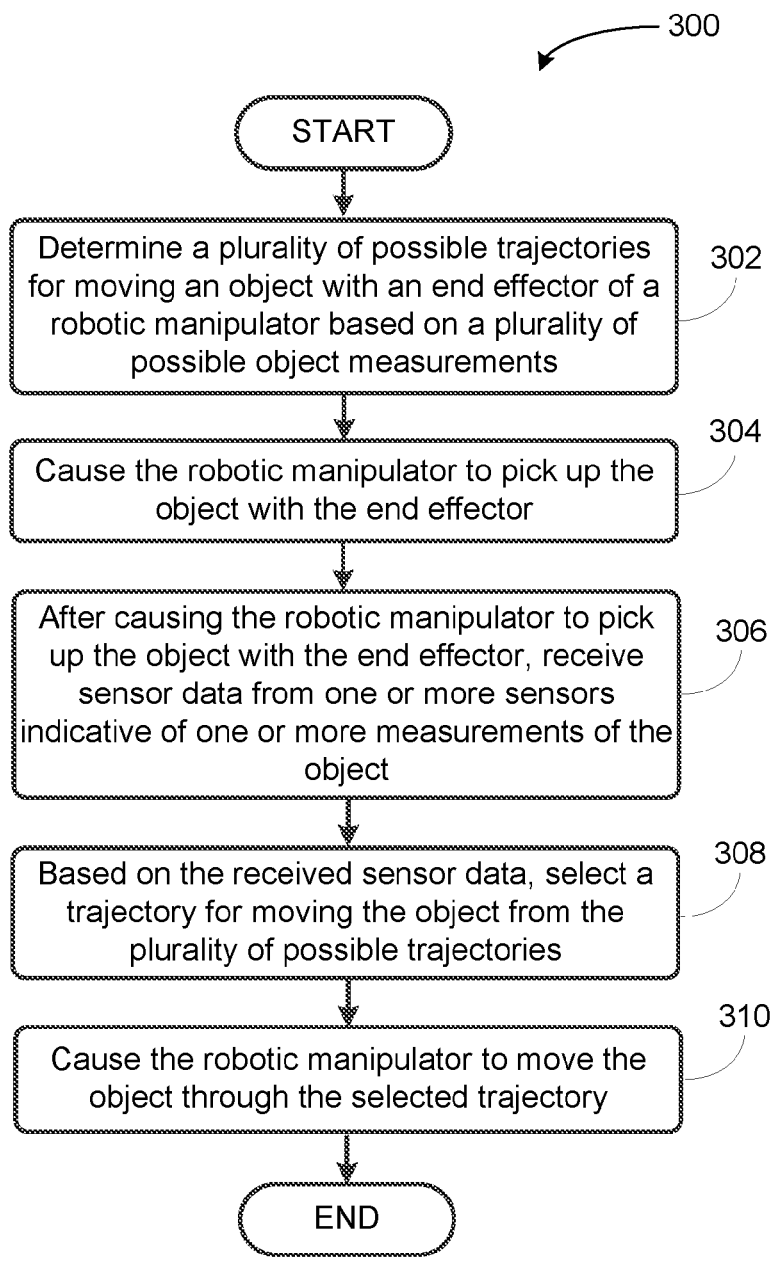
FIG. 3 is a block diagram of a method, according to an example embodiment.

FIG. 3 illustrates a flowchart showing a method 300 that may allow for determination of a trajectory for a robotic device to move an object, according to an example embodiment. Method 300 may be carried out using any robotic device described above, such as a device including a robotic arm mounted on a moveable cart with one or more sensors, as illustrated and described with respect to FIGS. 1A-1B. In other examples, method 300 may be carried out using a robotic manipulator mounted on a different type of movable apparatus, on a rail or track, or at a stationary location. In further examples, part or all of method 300 may be performed by one or more control systems located on a robotic device and/or in remote communication with a robotic device. Additionally, while examples with a single robotic arm may be described, various alternative embodiments may include any number of robotic arms, or may include other automated systems integrated with at least one robotic manipulator.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may initially involve determining a plurality of possible trajectories for moving an object with an end effector of a robot manipulator. More specifically, the possible trajectories may be determined based on different possible object measurements. In some examples, different trajectories may be determined for different possible values or ranges of values of a single object property. For instance, object properties that may influence the trajectory include object dimensions, size, shape, mass, center of gravity, and/or inertia matrix. In further examples, trajectories may be determined for different possible combinations of measurements of two or more different properties as well.

According to various embodiments, trajectories may be determined based on different object measurements in order to achieve different possible objectives and/or to maximize or minimize certain aspects of trajectories used by the robot. For instance, a trajectory may be determined to minimize the amount of time required to move an object to a particular location while ensuring that the robot's gripper does not drop the object. In a further example, another objective may be to determine a trajectory to move an object without causing a collision involving the object. In other examples, the path of the robot's end effector, the corresponding velocity curve, and/or the corresponding acceleration curve may be determined based on different object measurements. In further examples, the trajectory may be determined by solving a constrained optimization problem using different possible object measurements as inputs (e.g., to minimize the time needed to transport the object).

In additional examples, the endpoint of the trajectory used to transport an object may be determined based on different object properties. For example, a dropoff location for the object may be determined based on the size and/or dimensions of an object (e.g., to ensure that the object fits within the target dropoff location). In further examples, other object properties such as shape or mass may be used to determine the dropoff location as well or instead.

In some example embodiments, one or more of the trajectories may be determined in advance of picking up an object. For instance, trajectories for different possible object measurement may be determined minutes or seconds before picking up an object to avoid delay that may be caused by additional on-the-fly trajectory planning. In some examples, different trajectories may be determined for different possible ranges of object measurements for a particular property (e.g., a light box or a heavy box). In further examples, a different trajectory may be determined for different possible ranges of object measurements for each of two or more different properties (e.g., a heavy small box or a light large box). In such examples, a "tree" of possible trajectories may be determined with each level of the tree corresponding to different possible values of a particular object property. Accordingly, the bottom level of the tree may contain trajectories for each possible combination of values of two or more different object properties.

In additional examples, a common starting point for the possible trajectories may be determined based on when the sensor data used to select a trajectory will likely be available. The starting point may be a point in space (e.g., of the robot's gripper holding the object) and/or a particular point in time (e.g., 5 seconds after picking up the object). By planning the different possible trajectories to start from the common starting point, the robot can begin to use a selected trajectory at or near the point in time when the sensor data used to select the trajectory has been received.

Figure 4A:
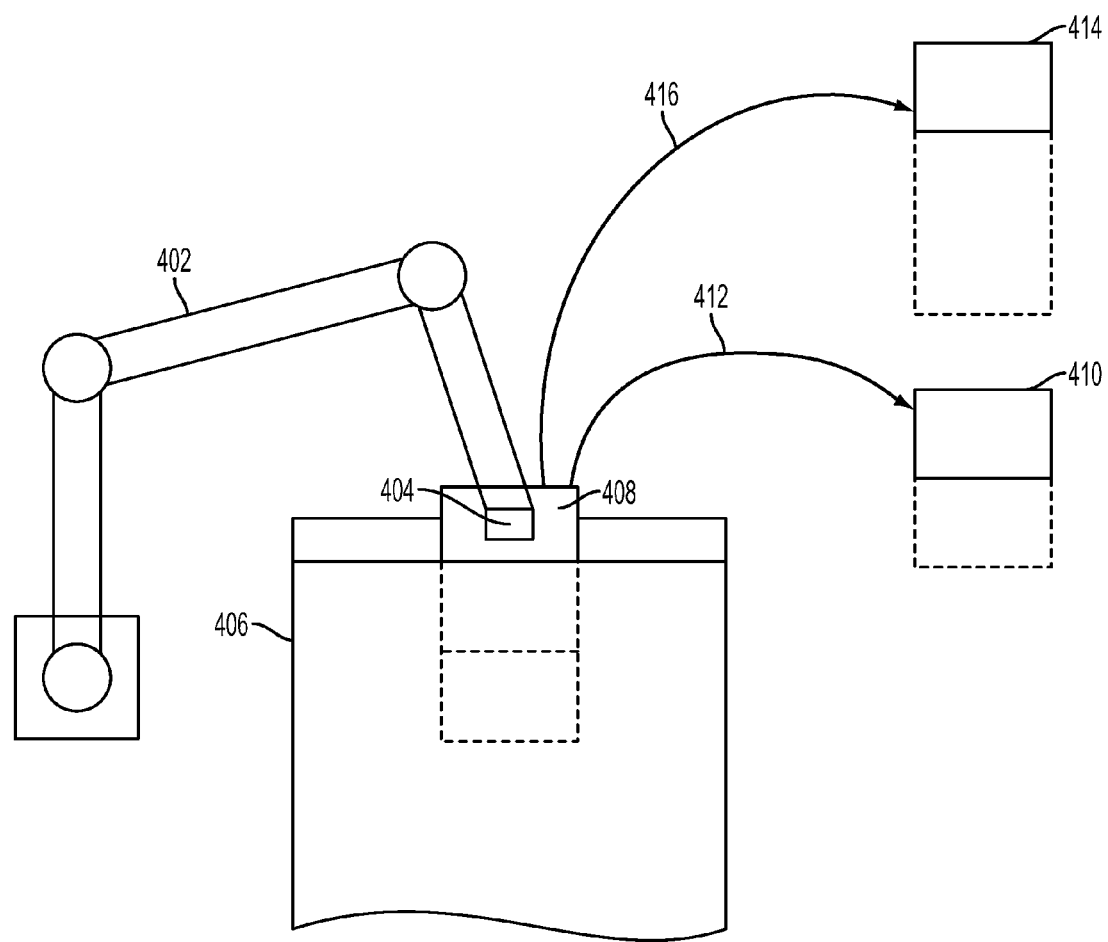
FIG. 4A illustrates different trajectories for moving an object with a robot, according to an example embodiment.

FIGS. 4A-4E collectively illustrate selection of a trajectory for a robot to move an object, according to an example embodiment. FIG. 4A illustrates different possible trajectories for moving the object. More specifically, a robotic arm 402 may have an end effector 404 such as a gripper for picking up and moving objects. The robotic arm 402 may be instructed (e.g., b a control system) to pick up a box 408 from a facade 406 containing a number of stacked boxes. In some examples, one or more measurements of the box 408 may not be known before the box 408 is picked up by the robotic arm 402. For example, as shown in FIG. 4A, the depth of box 408 may be unknown and may be difficult or impossible to determine while the box 408 is stacked within the facade 406 (e.g., if the box 408 is occluded from sensors by other boxes or objects).

In some examples, it may be possible to predict two or more likely possible measurements or ranges of measurements. For instance, in one example, the box 408 may be roughly cube-shaped or it may be rectangular. Box 410 illustrates one possible depth of box 408, and box 414 illustrates another possible depth of box 408. In further examples, more than two different possible measurements of box depth may be used. In other examples, additional unknown properties such as mass or center of gravity may be used as well or instead.

A first trajectory 412 may be determined for moving box 408 based on the first possible box depth 410. A second trajectory 416 may be determined for moving box 408 based on the second possible box depth 414. In some examples, trajectories 412 and 416 may be determined to move box 408 without causing the end effector 404 of robotic arm 402 to drop the box 408. In other examples, different trajectories may be determined in order to avoid collisions based on the predicted box sizes. For instance, it may be necessary to move a box shape 414 up higher in the air than a box shape 410 in order to avoid knocking over or otherwise colliding with other boxes within facade 406.

In some examples, paths through space for end effector 404 and/or box 408 (e.g., with 6 degrees of freedom) may be determined for trajectories 412 and 416. In other examples, velocity and/or acceleration curves corresponding to the paths may be determined as well. For instance, it may be possible to move box shape 410 faster than box shape 414 without causing the end effector 404 to drop the box during the movement.

In further examples, some or all of the possible trajectories may be determined after the robot arm 402 has picked up box 408. For example, a control system including a path planning component may be used to determine and/or modify trajectories on the fly as information about box properties becomes available based on received sensor data.

In one example, a first conservative trajectory may be used during an initial period after picking up the box. The conservative trajectory may be safe to use (e.g., to avoid collision or dropping the box) for any predicted or likely box measurements. For example, trajectory 416 may be a conservative trajectory that would work for both box size 414 and box size 410. In some examples, sensor data may later be received indicating that a more aggressive trajectory may be used (e.g., a smaller box may be moved faster). For instance, trajectory 412 may be a more aggressive trajectory determined at a later point in time after receiving sensor data indicative of the box size. In further examples, trajectories may be determined and/or refined at multiple points in time as more sensor data is received.

Referring back to FIG. 3, method 300 may further involve causing the robotic manipulator to pick up the object with the end effector, as shown by block 304. In some examples, the end effector may include a gripper, such as a suction gripper, that attaches to an object and allows the robotic manipulator (e.g., a robotic arm) to move the object through a trajectory. In further examples, different types of grippers or end effectors capable of moving objects may be used as well.

Figure 4B:
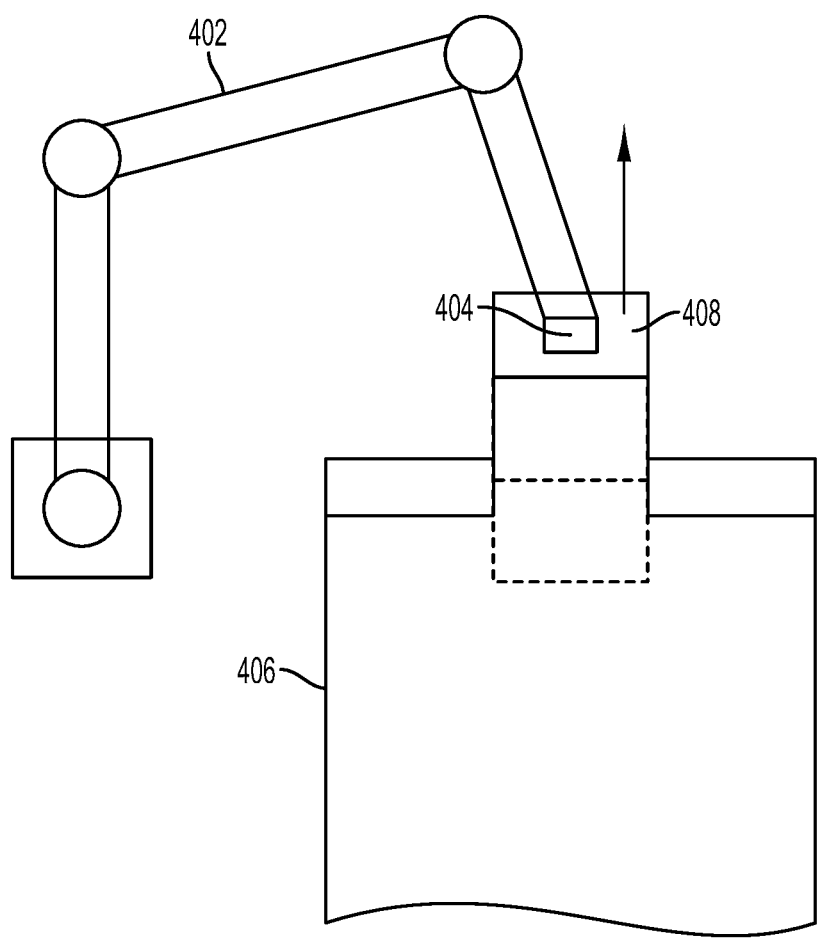
FIG. 4B illustrates picking up an object by the robot from FIG. 4A, according to an example embodiment.

FIG. 4B illustrates picking up an object by the robot from FIG. 4A, according to an example embodiment. More specifically, the robot arm 402 may be controlled to position its suction gripper 404 over the box 408 in order to lift the box 408 from the facade 406 of boxes. As shown here, in some examples, the object may need to be moved a certain amount in order to allow for depth sensors to collect sensor data to determine one or more dimensions of the object. For instance, the box 408 may need to be lifted far enough that its vertical depth is not occluded by other boxes within the facade 406 of boxes.

Referring back to FIG. 3, method 300 may further involve receiving sensor data from one or more sensors indicative of one or more measurements of the object, as shown by block 306. More specifically, after causing the the robotic manipulator to pick up the object (e.g., with a suction gripper), data may be received from one or more sensors, which may include combinations of different types of sensors, such as visual sensors, depth sensors, vacuum sensors, and/or force-torque sensors. In further examples, the sensor data may be received during an initial "system identification" phase of object movement after pickup. In some examples, an object may be positioned or maneuvered during the system identification phase in a manner that facilitates sensor data collection. In other examples, an object may simply be moved through an initial section of a planned path towards a dropoff location while the sensor data is received as well.

In some examples, one or more depth or visual sensors may be mounted or otherwise positioned on a robot arm. As the robot arm moves to grip and pick up an object, the on-arm sensor(s) may collect sensor data in order to estimate the dimensions, size, and/or shape of the object. In some examples, it may not be possible to determine one or more dimensions of an object using only on-arm sensors. For instance, one or more sides or faces of the object may be occluded from the on-arm sensors by a part of the robot or by other objects or things within the environment. Therefore, in some examples, it may be advantageous to combine sensor data from one or more on-arm sensors with sensor data from one or more off-arm visual or depth sensors positioned within the environment.

Figure 4C:
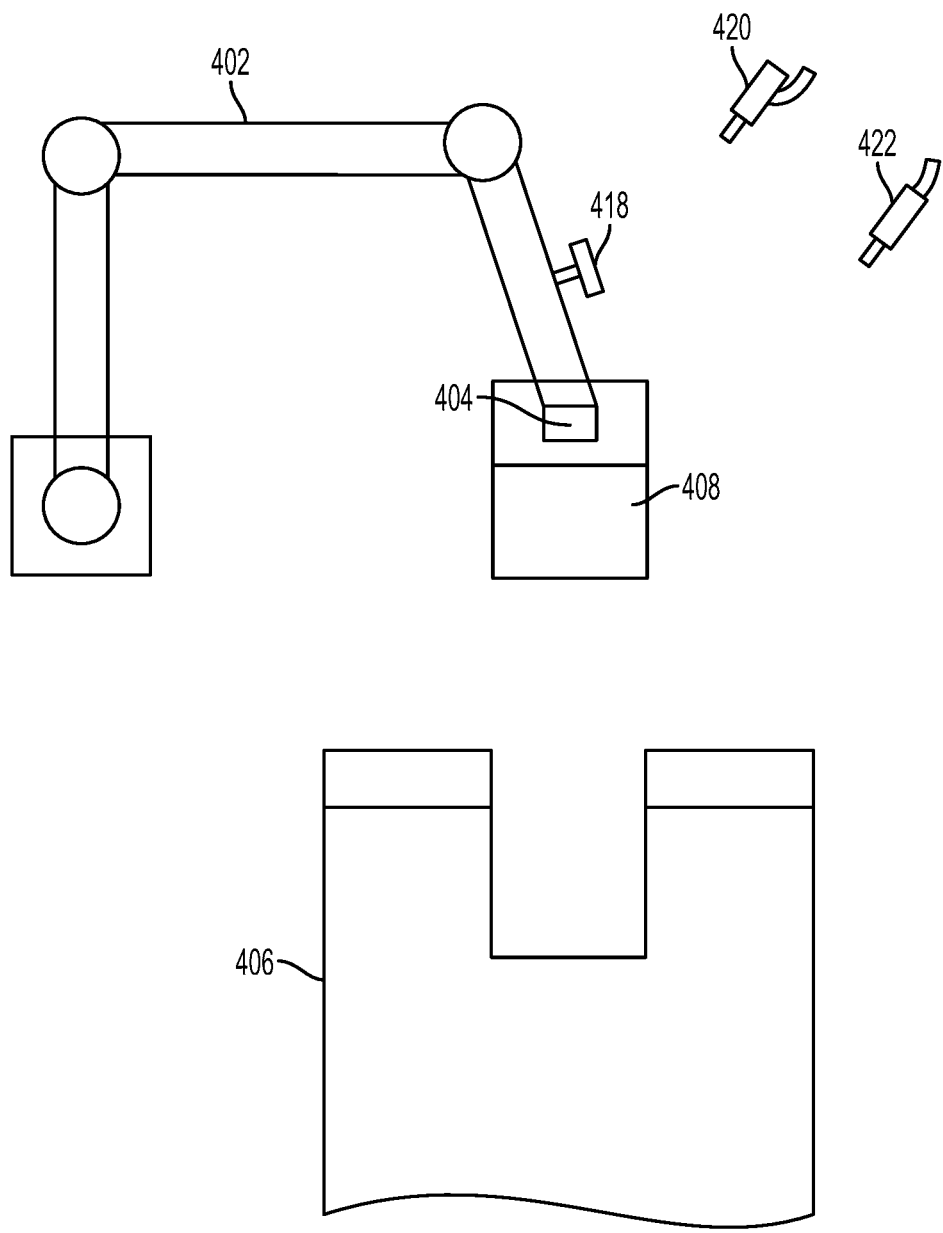
FIG. 4C illustrates sensors for measuring the object from FIG. 4A, according to an example embodiment.

FIG. 4C illustrates sensors for measuring the object from FIG. 4A, according to an example embodiment. More specifically, robot arm 402 may be equipped with sensor 418, which may be a depth sensor or visual sensor. Additionally, sensors 420 and 422 may be depth or visual sensors mounted or positioned at points within the environment. In some examples, locations for sensors 420 and 422 may be chosen to receive sensor data indicating one or more dimensions of objects such as box 408 that may be undetectable by on-arm sensor 418. Other combinations of more or fewer on-arm and/or off-arm sensors, including different types of sensors, are also possible.

In further examples, robot arm 402 may be controlled to move box 408 in front of one or more sensors, such as sensor 420 or 422, during an initial system identification phase. During this phase, one or more unknown dimensions of box 408 may first be identified. A trajectory or path for robot 402 to use to move box 408 may then be determined so that the unknown dimensions of box 408 are oriented so that they can be detected by one or more off-arm and/or on-arm sensors. In further examples, the system may also determine an estimation of when sensor data will be received that will allow for estimation of the unknown box dimensions. In some examples, this time or the expected location of robot 402 at this time may be used as a starting point for determining a trajectory for robot 402 to move box 408.

In additional examples, a triangulation depth sensor may be mounted on a robotic arm for sensing of close objects, such as an object gripped by the robotic arm's gripper. The triangulation depth sensor may include a laser beam projector and a camera with a predetermined offset from the laser beam projector. The position of the laser beam projector and the camera may then be used to triangulate the position of points on an object where the camera detects the laser. In further examples, the triangulation depth sensor may have a low profile to avoid occlusion by the robotic arm or other components mounted on the robotic arm while detecting close objects.

Figure 5:
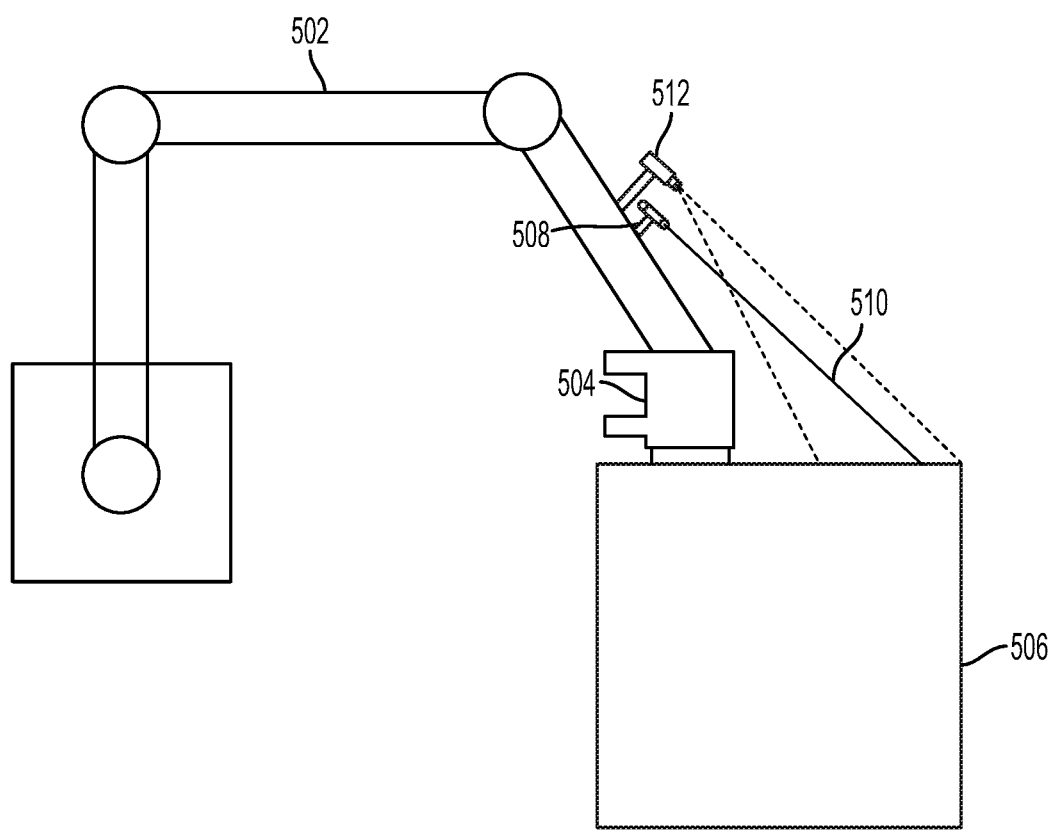
FIG. 5 illustrates a triangulation depth sensor, according to an example embodiment.

FIG. 5 shows a triangulation depth sensor, according to an example embodiment. More specifically, a laser beam projector 508 may be mounted on robot arm 502 at a point that allows for depth detection in one or more dimensions of a box 506 gripped by gripper 504. Additionally, offset camera 512 may be mounted robot arm 502 with a known offset from laser beam projector 508. The camera 512 may be configured to detect a laser beam 510 projected by the laser beam projector 508 onto the box 506. The laser beam projector 508 may be controlled to project the laser 510 onto different points on box 506, and a point at which the laser beam 510 is no longer detectable on the box 506 by camera 512 may be determined. By triangulating the point at which laser beam 510 is no longer detectable using the position of laser beam projector 508 and camera 512, an estimate of an edge of box 506 and a corresponding depth of box 506 may be determined. In further examples, a triangulation depth sensor may be used in combination with one or more other on-aim sensors and/or one or more off-arm sensors as well.

In additional examples, a robot may be equipped with a force-torque sensor to assist in determining measurements of an object. More specifically, a force-torque sensor may be positioned on a robot arm above a gripper in order to detect forces and/or torques caused by an object that has been picked up by the gripper. A number of different properties of an object may be measured by a force-torque sensor for purposes of trajectory planning, possibly including mass, center of gravity, center of mass, how static the center of mass is, and/or inertia matrix. In further examples, a force-torque sensor may also be used to measure the depth of an object in one or more dimensions as well.

Figure 6A:
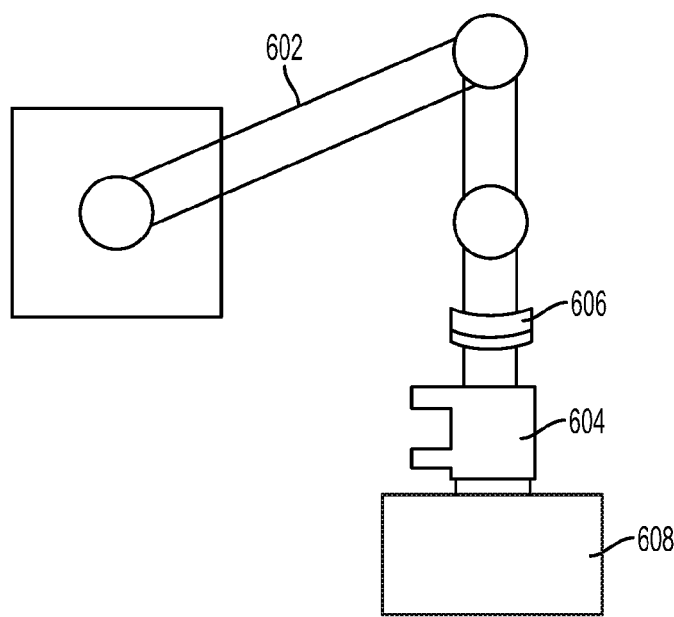
FIG. 6A illustrates a robotic manipulator with a force-torque sensor, according to an example embodiment.

FIG. 6A illustrates a force-torque sensor positioned on a robot arm, according to an example embodiment. More specifically, robot arm 602 may be equipped with a gripper 604, such as a suction gripper, for picking up and moving objects. A force-torque sensor 606 may be positioned on robot arm 602 at a point above gripper 604 in order to detect force and/or torque caused by gripped objects. Robot arm 602 may be controlled to grip a box 608 using gripper 604. Sensor data from force-torque sensor 606 may then be received and used to determine properties of box 608, such as its mass, center of gravity, and/or full inertia matrix.

In further examples, a force-torque sensor may also be used to estimate unknown object dimensions. More specifically, by pivoting an object around an edge of the object in contact with an adjacent surface, the system can use the trajectory followed by the gripper to determine the depth of the object from the edge of the object. While pivoting the object, the system can use force control (e.g., based on data received from the force-torque sensor) to maintain contact between the edge of the object and the adjacent surface without prior knowledge of the box dimension. The radius of the obtained gripper trajectory may then indicate a particular dimension of the object from the edge of the object in contact with the adjacent surface.

Figure 6B:
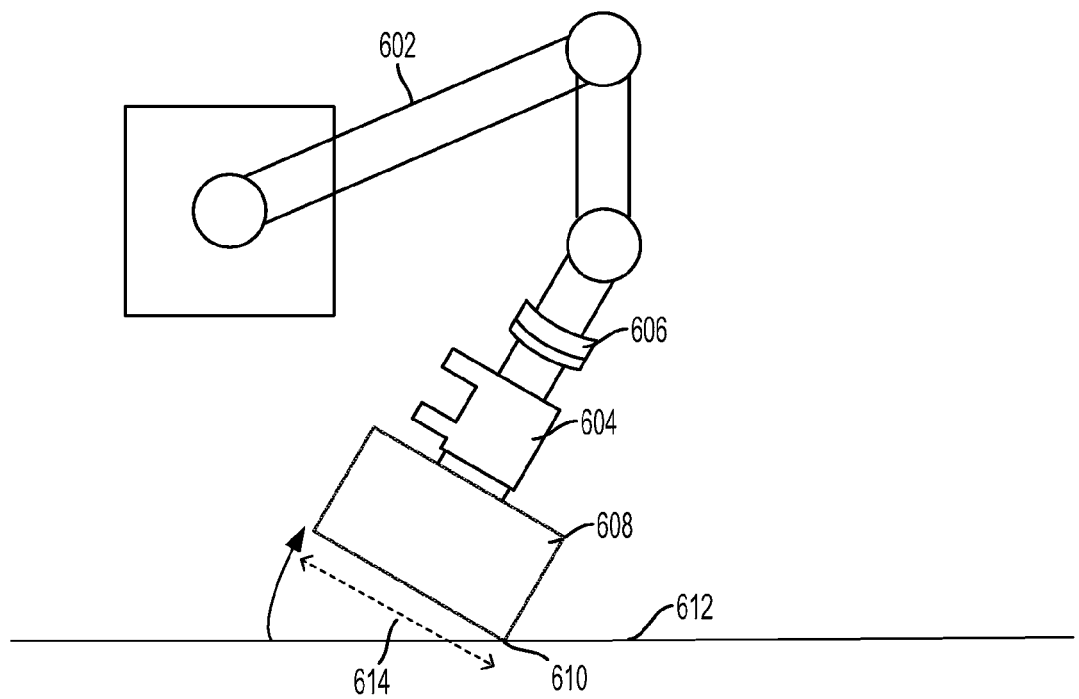
FIG. 6B illustrates use of the force-torque sensor from FIG. 6A to determine object dimension, according to an example embodiment.

FIG. 6B illustrates an example application of the force-torque sensor from FIG. 6A to determine object dimension. In particular, box 608 may be gripped by gripper 604 and an edge of box 608 may be pivoted by robot arm 602 around a contact point 610 on adjacent surface 612. Sensor data received from force-torque sensor 606 indicating forces on robot arm 602 caused by object 608 may be used to ensure that the edge of box 608 maintains contact with surface 612 at contact point 610 as robot 602 pivots box 608. The radius of the trajectory followed by gripper 604 may then be used to estimate the depth 614 of box 608 from the edge of the object in contact with adjacent surface 612.

In some examples, adjacent surface 612 may be the ground or floor. In other examples, adjacent surface 612 may instead be surfaces of one or more other objects located underneath box 608, such as when box 608 is picked from a stack of boxes. In further examples, other surfaces within the environment may be used as contact points to pivot the object as well or instead.

In further examples, the process of pivoting an object about an edge of the object may be repeated using one or more other edges of the object as the contact point to determine one or more additional dimensions of the object.

In additional examples, sensor data received during an initial system identification phase may be also used for error correction. For instance, the robot may have been instructed to pick up an object by gripping the object at a particular point. Sensor data from one or more sensors may indicate that the object was mispicked and needs to be set down and picked up again. For instance, visual or depth sensor data may indicate that the gripper is not positioned at the point on the object that the robot was instructed to use (e.g., due to errors in optical sensing or calibration). In another example, the force-torque sensor may indicate that the object has an unexpected center of mass biased toward one side or the other. In such an example, it may be advantageous to put the object back down and grip it at a different point to account for the information learned from the sensor data.

Referring back to FIG. 3, method 300 may additionally include selecting a trajectory for moving the object from the possible trajectories, as shown by block 308. In particular, after receiving sensor data to determine or estimate one or more measurements of one or more properties of an object, a trajectory may be selected for an object with the determined or estimated measurements. For instance, if possible trajectories were planned for a small box, a medium-size box and a large box, then after determining the size of the box, the corresponding trajectory may be selected for moving the box.

In further examples, trajectories may be selected based on multiple object properties for which measurements may be determined at different times. For instance, possible trajectories may be planned for objects with different weights and different depths. The weight may be determined shortly after picking up the object using a force-torque sensor. The depth may be determined at a later point in time using one or more depth sensors. In such an example, a trajectory may first be selected once the weight has been determined corresponding to the determined weight and the most conservative predicted depth (e.g., the largest possible box). Then, at a later point in time when the depth of the object has been determined, a trajectory corresponding to both the determined weight and determined depth may be selected and used from that point forward.

In further examples, one or more trajectories may be determined and selected at the same time. For instance, in one example, the object may first be moved through a conservative trajectory that assumes an object has measurements requiring the slowest movement or longest possible path. Then, if sensor data indicates that the object has different measurements such that faster movement or a shorter path can safely be used, a new trajectory may be determined on the fly. In such example, the new trajectory may be selected and the robot may switch to using the new trajectory as soon as it has been determined using the received sensor data.

Figure 4D:
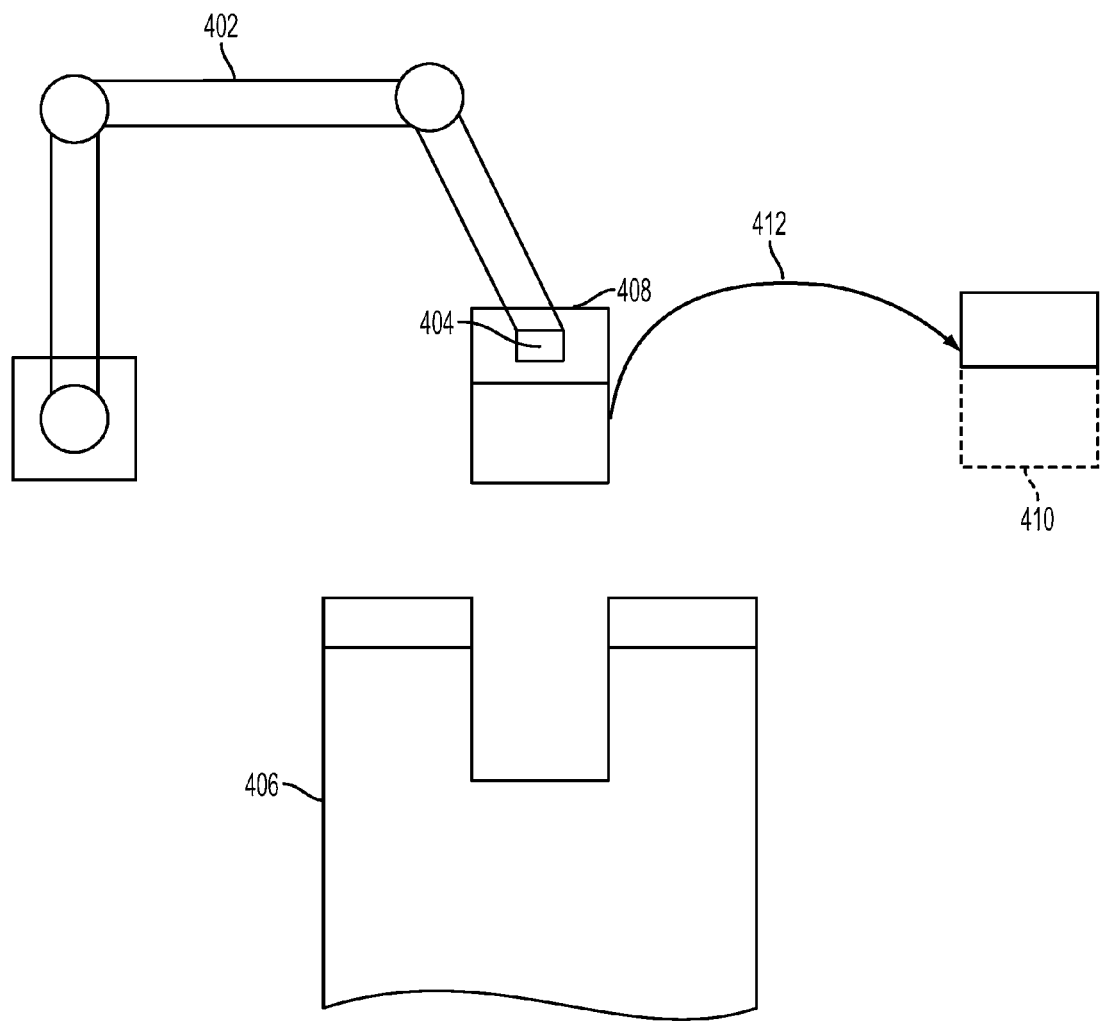
FIG. 4D illustrates a selected trajectory for moving the object from FIG. 4A, according to an example embodiment.

FIG. 4D illustrates a selected trajectory for moving the object from FIG. 4A, according to an example embodiment. More specifically, sensor data may indicate that box 408 has a depth corresponding to box shape 410 (as opposed to previously illustrated box shape 414). Accordingly, trajectory 412 may selected for robot arm 402 to use to move box 408. In further examples, trajectory 412 may be selected from more than two possible trajectories. In additional examples, trajectory 412 may be further refined from a predetermined trajectory based on estimated or determined box measurements.

Referring back to FIG. 3, method 300 may further involve causing the robot to move the object through the selected trajectory, as shown by block 310. In some examples, the robot may switch to the selected trajectory at a point in time that marks the end of a system identification phase. In further examples, the trajectory may be modified or adjusted at one or more points along the path based on additional received sensor data. In some examples, the additional modifications may occur at additional planned points in time or space as well.

Figure 4E:
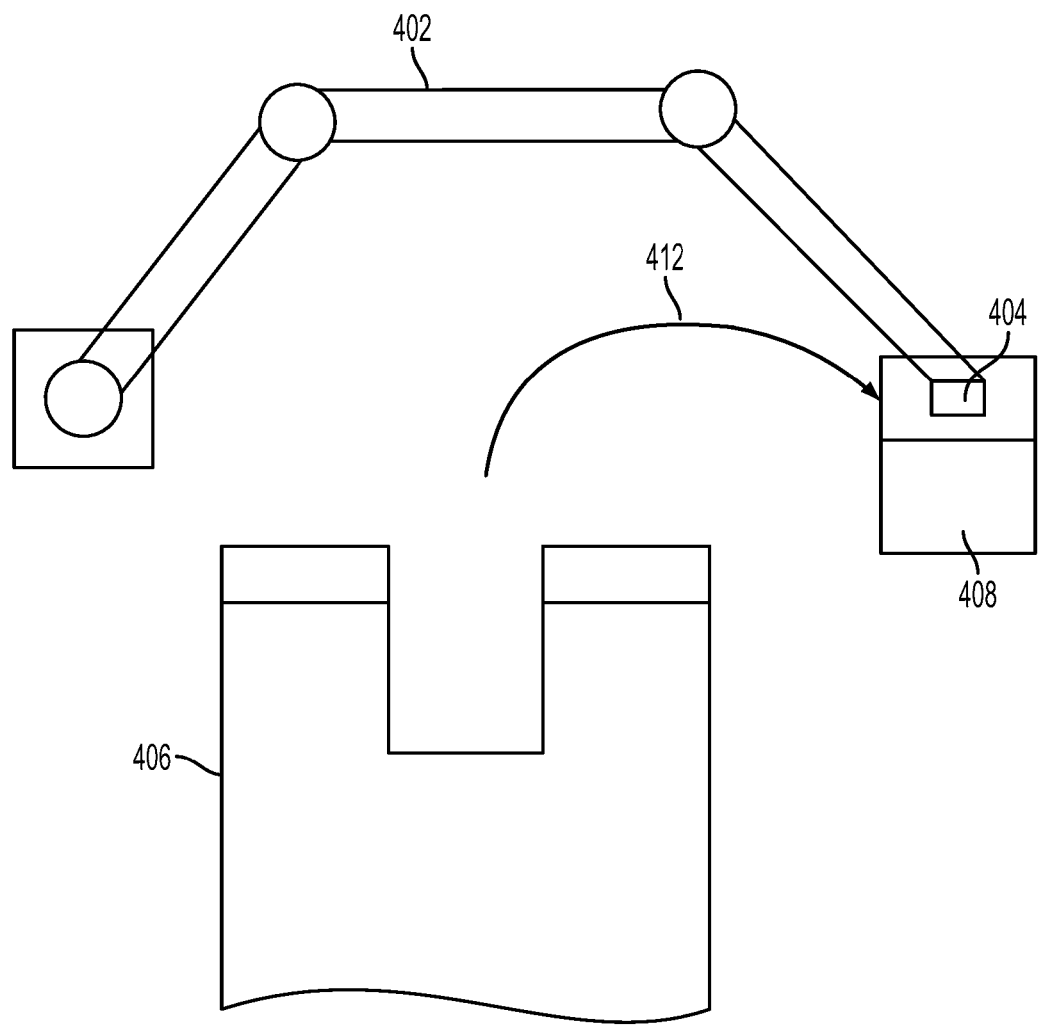
FIG. 4E illustrates moving the object through the selected trajectory from FIG. 4D, according to an example embodiment.

FIG. 4E illustrates moving the object through the selected trajectory from FIG. 4D, according to an example embodiment. More specifically, robot arm 402 may be commanded to move object 408 through the selected trajectory 412. Instructions to cause robot arm 402 to move an object may be sent by a control system located on the robotic device, by a remote control system, and/or by a combination of onboard and remote control systems.

In further examples, information about object measurements and/or selected trajectories may be recorded and used for future robot control. For example, it may be determined that certain possible trajectories are planned but rarely used by the robot, in which case it may not be necessary to plan those trajectories. In other examples, it may be determined that certain planned trajectories don't work well for particular object measurements, in which case the planned trajectories may be modified for future use. Other types of machine learning may also be used to refine trajectory planning for moving objects using a robotic device as well.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of method 300 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software in and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   causing, by a control system, a robotic manipulator to pick up an object in an environment with an end effector;
   causing, by the control system, the robotic manipulator to pivot the object around an edge of the object in contact with a surface in the environment;
   while causing the robotic manipulator to pivot the object, using sensor data from a force-torque sensor to cause, by the control system, the robotic manipulator to follow a trajectory that maintains contact between the edge of the object and the surface in the environment;
   determining, by the control system, a radius of the trajectory followed by the robotic manipulator in pivoting the object around the edge of the object; and
   determining, by the control system, at least one unknown dimension of the object based on the radius of the trajectory followed by the robotic manipulator.

2. The method of claim 1, further comprising causing the robotic manipulator to follow a trajectory that maintains contact between the edge of the object and the surface in the environment at a fixed contact point on the surface of the environment.

3. The method of claim 1, wherein the at least one unknown dimension of the object is measured from the edge of the object in contact with the surface in the environment.

4. The method of claim 1, further comprising:
   causing the robotic manipulator to pivot the object around a second edge of the object in contact with the surface in the environment;
   while causing the robotic manipulator to pivot the object around the second edge, using sensor data from the force-torque sensor to cause the robotic manipulator to follow a second trajectory that maintains contact between the second edge of the object and the surface in the environment; and
   determining at least one other dimension of the object based on the second trajectory followed by the robotic manipulator.

5. The method of claim 1, further comprising:
   determining, based on the at least one unknown dimension of the object, a path for moving the object to a drop-off location; and
   causing the robotic manipulator to move the object to the drop-off location through the determined path.

6. The method of claim 5, further comprising determining at least one other dimension of the object based on sensor data from at least one of a depth sensor and a visual sensor, wherein determining the path for moving the object to the drop-off location is further based on the sensor data from the at least one of a depth sensor and a visual sensor.

7. The method of claim 1, wherein the at least one unknown dimension of the object is at least one of a width of the object, a height of the object, and a depth of the object.

8. The method of claim 1, wherein the object is a rectangular object, wherein causing the robotic manipulator to pick up the object comprises causing the end effector to grip the rectangular object from a first side, and wherein the at least one unknown dimension of the rectangular object is a dimension of a second side of the rectangular object, wherein the second side is opposite the first side of the rectangular object.

9. The method of claim 1, wherein the object is a first rectangular object, and wherein the surface in the environment is a face of a second rectangular object.

10. The method of claim 1, wherein the end effector of the robotic manipulator comprises a gripper, and wherein the force-torque sensor is positioned above the gripper on the robotic manipulator.

11. The method of claim 10, wherein the gripper comprises at least one suction gripper.

12. A system, comprising:
    a robotic manipulator;
    a force-torque sensor; and
    a control system configured to:
       cause the robotic manipulator to pick up an object in an environment with an end effector;
       cause the robotic manipulator to pivot the object around an edge of the object in contact with a surface in the environment;
       while causing the robotic manipulator to pivot the object, use sensor data from the force-torque sensor to cause the robotic manipulator to follow a trajectory that maintains contact between the edge of the object and the surface in the environment;
       determine a radius of the trajectory followed by the robotic manipulator in pivoting the object around the edge of the object; and
       determine at least one unknown dimension of the object based on the radius of the trajectory followed by the robotic manipulator.

13. The system of claim 12, wherein the control system is further configured to cause the robotic manipulator to follow a trajectory that maintains contact between the edge of the object and the surface in the environment at a fixed contact point on the surface of the environment.

14. The system of claim 12, wherein the at least one unknown dimension of the object is measured from the edge of the object in contact with the surface in the environment.

15. The system of claim 12, wherein the control system is further configured to:
    cause the robotic manipulator to pivot the object around a second edge of the object in contact with the surface in the environment;
    while causing the robotic manipulator to pivot the object around the second edge, use sensor data from the force-torque sensor to cause the robotic manipulator to follow a second trajectory that maintains contact between the second edge of the object and the surface in the environment; and
    determine at least one other dimension of the object based on the second trajectory followed by the robotic manipulator.

16. The system of claim 12, wherein the control system is further configured to:
    determine, based on the at least one unknown dimension of the object, a path for moving the object to a drop-off location; and
    cause the robotic manipulator to move the object to the drop-off location through the determined path.

17. The system of claim 12, wherein the end effector of the robotic manipulator comprises a gripper, and wherein the force-torque sensor is positioned above the gripper on the robotic manipulator.

18. A non-transitory computer readable medium having stored therein instructions, that when executed by a computing system, cause the computing system to perform functions comprising:

causing a robotic manipulator to pick up an object in an environment with an end effector;

causing the robotic manipulator to pivot the object around an edge of the object in contact with a surface in the environment;

while causing the robotic manipulator to pivot the object, using sensor data from a force-torque sensor to cause the robotic manipulator to follow a trajectory that maintains contact between the edge of the object and the surface in the environment;

determining a radius of the trajectory followed by the robotic manipulator in pivoting the object around the edge of the object; and determining at least one unknown dimension of the object based on the radius of the trajectory followed by the robotic manipulator.

19. The non-transitory computer readable medium of claim 18, wherein the functions further comprise causing the robotic manipulator to follow a trajectory that maintains contact between the edge of the object and the surface in the environment at a fixed contact point on the surface of the environment.

20. The non-transitory computer readable medium of claim 18, wherein the functions further comprise:

determining, based on the at least one unknown dimension of the object, a path for moving the object to a drop-off location; and providing instructions to cause the robotic manipulator to move the object to the drop-off location through the determined path.

\* \* \* \* \*